UNITED STATES PATENT OFFICE.

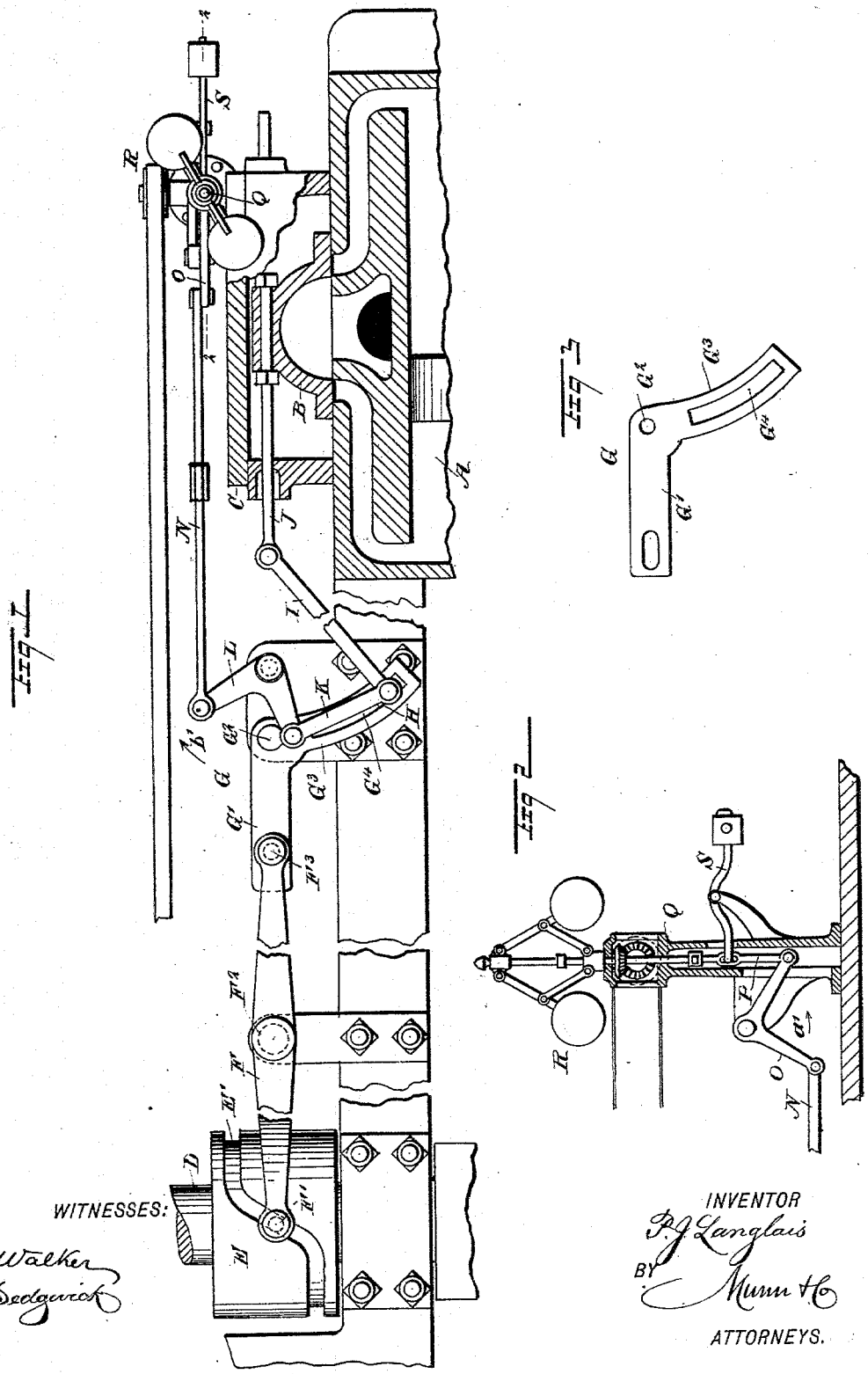

PASCAL J. LANGLAIS, OF MILWAUKEE, WISCONSIN.

VALVE-GEAR.

SPECIFICATION forming part of Letters Patent No. 511,085, dated December 19, 1893.

Application filed April 12, 1893. Serial No. 470,040. (No model.)

*To all whom it may concern:*

Be it known that I, PASCAL J. LANGLAIS, of Milwaukee, in the county of Milwaukee and State of Wisconsin, have invented a new and Improved Valve-Gear, of which the following is a full, clear, and exact description.

The object of the invention is to provide a new and improved valve gear, which is simple and durable in construction, very effective in operation, and arranged for automatically increasing or decreasing the travel of the valve, to admit more or less steam to the cylinder according to the varying load.

The invention consists principally of a cam driven from the main driving shaft, and imparting a swinging motion to a lever connected with a bell crank lever, having one of its arms slotted to receive a sliding block connected by a link with the valve stem.
The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a plan view of the improvement as applied, with the cylinder and steam chest in section. Fig. 2 is a sectional side elevation of the governor on the line 2—2 of Fig. 1; and Fig. 3 is a plan view of the bell crank lever.

The engine on which the valve gear is applied is of any approved construction, and is provided with the usual cylinder A, the slide valve B operating in the steam chest C, and the main driving shaft D connected in the usual manner with the piston reciprocating in the cylinder A. On the driving shaft D is secured a cam wheel E formed in its periphery with a cam groove E′, in which travels a friction roller F′ held on one end of a lever F fulcrumed at $F^2$ on the main frame of the engine. The forward end $F^3$ of the lever F engages a slot in the arm G′ of a bell crank lever G fulcrumed at $G^2$ on a bracket of the main frame of the engine, as is plainly shown in Fig. 1. The other arm $G^3$ of the bell crank lever G is segmental and is formed with a segmental slot $G^4$, in which is fitted to slide the sliding block H, pivotally connected by a link I with the stem J of the slide valve B. The block H is also pivotally-connected by a link K with a bell crank lever L, pivotally-connected by a link N with a second bell crank lever O, connected by a rod P with the stem Q of the governor R, of any approved construction. The connection between the rod P and the stem Q is such as to permit the latter to turn without turning the rod P, when the latter moves up and down with the governor stem on the outward or inward motion of the governor balls. The rod P is provided with a slot engaged by the inner end of the weighted lever S, fulcrumed on the governor frame. See Fig. 2. The governor is driven in the usual manner from the driving shaft B.

The operation is as follows: When the engine is running, the rotary motion given to the driving shaft D causes the cam wheel E to revolve, whereby the cam groove E′ acting on the friction wheel F′ causes a swinging of the lever F, so that a swinging motion is given to the bell crank lever G. The latter, by the block H held in a certain position by the connection of the link K with the bell crank lever L, imparts a reciprocating motion by the link I to the stem J and valve B, the travel of which is greatest when the block H is in the outer end of the segmental slot $G^4$. The position of the block H in the segmental slot $G^4$ is controlled by the governor R, which on an increase of the speed of the engine, causes an upward pull on the rod P, which thus gives a swinging motion to the bell crank lever O in the direction of the arrow $a′$, see Fig. 2, thus giving a like motion to the bell crank lever L, as the latter is connected with the bell crank lever O by the link N. The swinging motion of the bell crank lever L in the direction of the arrow $b′$, causes a pull on the link K, so that the sliding block H is moved nearer to the fulcrum $G^2$, whereby the travel of the slide valve B is decreased, and consequently less steam is admitted to the cylinder. Now, when the load increases and a consequent decrease of speed is the result, then the governor balls move inward, so that the rod P is moved downward and a swinging motion is given to the bell crank lever O, in the inverse direction of the arrow $a′$, and a like motion is given to the lever L in the inverse direction of the arrow $b′$. The movement of the bell crank lever causes a downward shifting of the block H in the segmental slot G⁴, whereby the travel of the slide valve B is increased, and consequently the ports are opened more fully and remain open longer to admit more steam. It will thus be seen that the travel of the slide valve is automatically controlled by the governor according to the load.

Having thus fully described my invention, I claim as new and desire to secure by Letters Patent—

1. A valve gear comprising a cam rotated with the driving shaft of the engine, a lever receiving a swinging motion from the said cam, a bell crank lever pivotally-connected with the said lever and having one of its arms formed with a segmental slot, and a sliding block held adjustable in the said segmental slot of the said bell crank lever, the said sliding block being connected with the slide valve, substantially as shown and described.

2. A valve gear comprising a cam rotated with the driving shaft of the engine, a lever receiving a swinging motion from the said cam, a bell crank lever pivotally-connected with the said lever and having one of its arms formed with a segmental slot, a sliding block held adjustable in the said segmental slot of the said bell crank lever, the said sliding block being connected with the slide valve, and a governor for controlling the position of the said sliding block in the said segmental slide, substantially as shown and described.

3. A valve gear comprising a bell crank lever receiving a swinging motion from the driving shaft and formed in one of its arms with a segmental slot, a block fitted to slide in the said segmental slot of the bell crank lever, a link connecting the said sliding block with the stem of the slide valve; a second link connected with the said sliding block, a second bell crank lever connected with the said second link, and a governor having its stem connected with the said second bell crank lever to control the position of the sliding block in the said segmental slot, substantially as shown and described.

PASCAL J. LANGLAIS.

Witnesses:
 ERNEST A. KEHR,
 TH. KRONSHAGE, Jr.